United States Patent [19]

Gaunaurd et al.

[11] 4,415,898

[45] Nov. 15, 1983

[54] METHOD OF DETERMINING THE MATERIAL COMPOSITION OF A DIELECTRICALLY COATED RADAR TARGET/OBSTACLE

[75] Inventors: Guillermo C. Gaunaurd, Rockville, Md.; Herbert Überall, Washington, D.C.

[73] Assignee: The United States of America as represented by the Secretary of the Navy, Washington, D.C.

[21] Appl. No.: 278,294

[22] Filed: Jun. 26, 1981

[51] Int. Cl.³ .............................................. G01S 13/00
[52] U.S. Cl. .................................... 343/5 SA; 73/602
[58] Field of Search ...................................... 343/55 A

[56] References Cited

U.S. PATENT DOCUMENTS 3,733,603  5/1973  Johnston ......................... 3243/55 A
4,249,422  2/1981  Gaunaurd ............................. 73/589

OTHER PUBLICATIONS

G. Gaunaurd et al. "New method to Det. Shear Absorption Using Viscoelastodynamic Resonance Scattering Formalism," J. Acoust. Soc. Am., vol. 64, No. 4, pp. 1211–1212, Oct. 1978.

G. Gaunaurd et al, "Deciphering Scattering Code Contained in Resonance Echos from Fluid Filled Cavities in Solids," Science vol. 206, pp. 61–64, Oct. 1979.

Primary Examiner—Maynard R. Wilbur
Assistant Examiner—Maria Gordon
Attorney, Agent, or Firm—R. S. Sciascia; A. L. Branning; J. G. Wynn

[57] ABSTRACT

An apparatus for and a method of determining the material properties of a dielectric and/or conducting radar target by deciphering the backscattered signals returned from the target is disclosed. The resonance "code" of the echo signals from the target is a function of the width and spacing of the resonant spectral lines in the transverse electric (TE) and transverse magnetic (TM) modes of the returned signals. The resonances present in any TE or TM mode become uniformly spaced and of uniform width at high frequencies. The uniform spacing between adjacent resonances is used to uniquely determine the dielectric constant of the material comprising the target, and their uniform width is used to uniquely determine its thickness.

4 Claims, 9 Drawing Figures

METHOD OF DETERMINING THE MATERIAL COMPOSITION OF A DIELECTRICALLY COATED RADAR TARGET/OBSTACLE

BACKGROUND OF THE INVENTION

1. Field of the Invention

The present invention relates to deciphering the electromagnetically scattered echoes returned by obstacles in continuous media, and more particularly to a an apparatus for and a method of determining the geometry and material composition of a dielectric and/or conducting radar target by deciphering the backscattered signal returned from the target.

2. Description of the Prior Art

In the general field of electromagnetic backscattering, it is quite important and desirable to identify the composition of radar targets. This would allow the distinction between a real incoming target and a decoy, or once it is determined that the target is real, it would permit the distinction between various types of similar targets. Thus, it would become possible to classify target/obstacles as friendly or not. In either situation, the type or class of target/obstacle that returned the backscattered signals or echoes can be determined.

Heretofore, the prior art has analysed the electromagnetic echoes returned by targets of simple shapes. With few exceptions, the actual numerical calculations available in the prior art are sparse, pertain only to a few conductors, and rarely include penetration effects through dielectrics, or effects in the resonance region present beyond the low frequency (i.e., Rayleigh) spectral regime. Some of the prior art has attributed the rapid oscillations in cross-sectional values that are observed, to some sort of resonant phenomena; however, little or no effort has been made to actually cast the analysis into some explicit resonant form. In fact, the electromagnetic backscattering cross section of simple shaped targets, when plotted as function of frequency, exhibit so many rapid oscillations and complicated features that until the very recent teachings described in the present application, it did not appear possible to extract any physical information that may have been contained in them.

To predict the type of echo that a given target/obstacle will return when it is illuminated with a certain incident electromagnetic waveform is a direct scattering problem that has been "solved" in very few instances, i.e., for selected "separable" shapes, simple compositions, selected frequency ranges, etc. To extract physical information about a target/obstacle from the backscattered echos it has returned, and that has been somehow received and recorded, is an inverse scattering problem that has not been previously solved, as far as is known, even in the simplest of instances. Some theories and feasibility studies have been advanced but as far as is known, not even a simple flying gasfilled balloon has actually been identified by any scheme. A good present day radar system merely indicates how far the scattering target/obstacle is from the observer, and in which direction, provided the radar system is sensitive enough to pickup the returned signal, and sophisticated enough to pull it out of the ambient noise it comes buried into. No information is ever extracted about size, composition, shape, internal or external structures, weight, etc. of the scattering target/obstacle.

OBJECTS OF THE INVENTION

Accordingly, an important object of the present invention is to decipher the "scattering resonance code" in the electromagnetic (i.e., radar) backscattered echoes for whatever conducting or dielectric material coating comprises a radar target, in order to ascertain information about the shape and material composition of the scattering target.

Another object of the present invention is to decipher the "material composition code" for targets of known shape in order to determine the dielectric constant of the target or of the material coating that may be covering the radar target.

Yet another object of the present invention is to decipher the "material composition code" for a target of known shape in order to determine the thickness of the material coating that may be covering the radar target.

A further object of the present invention is to use the uniform spacing of the spectral lines of the backscattered signals, ascertained from deciphering the "material composition code", to determine the dielectric constant of the target or of the coating that may be covering it.

Still a final object of the present invention is to use the uniform width of the spectral lines of the backscattered signals, ascertained from deciphering the "material composition code", to determine the thickness of the coating material that may be covering the target.

SUMMARY OF THE INVENTION

In accordance with the above objects, features and advantages, the present invention has a primary purpose to determine the material properties of a dielectric coating covering a conducting radar target, i.e., the dielectric constant and thickness of the coating. The essence of the present invention is in the method of deciphering the "scattering resonance code" in electromagnetic backscattered echoes from dielectric coatings covering conducting radar targets. When the foregoing is known, the method of deciphering the "material composition code" for a target of known shape, in order to determine the dielectric constant and thickness of the material coating that may be covering the radar target follows. It also follows for totally dielectric (uncoated) radar targets.

The method is carried out by directing an incident waveform, comprising electromagnetic radiation of a known frequency spectrum, at a distant target thereby creating electromagnetic oscillations on the target including a superposition of a set of modal resonances. These resonance oscillations are communicated by the target to the echoes backscattered from the target and are received and converted into electrical signals. These electrical signals are further converted into an echo pattern commonly called the "radar cross-section" of the target. This echo pattern is a plot of squared scattering amplitudes versus frequency. Each echo pattern is subdivided into its partial-wave components, each of which corresponds to a particular oscillatory mode.

The next critical step in the method is determining the "background" portions of the partial-wave modal components. These "background" components are equal to the response returns from a perfectly conducting scatterer of the same size. This "background" portion is obtained from the general partial-wave contribution by setting the modal impedances and admittances ($Z_n$ and $Y_n$, respectively) equal to zero and infinity, respectively and simultaneously. These "background" components are then substracted from each of the partial-wave response of the same mode, thereby isolating the resonances in the spectrum which consist of a fundamental and overtones for each modal contribution.

Observing and determining the asymptotic spacing between any consecutive pair of high-order modal overtones and also the width of any of the high-order overtones is the next step in the method of the invention. These two quantities, spacings and widths, are used to obtain the dielectric constant and the thickness of the coating layer covering the conducting core of the target, or if the target is totally dielectric with no conducting core, to determine its dielectric constant.

BRIEF DESCRIPTION OF THE DRAWINGS

The essence and purpose of the present invention, as well as other objects, features, advantages and uses will be apparent from the following more particular description of the preferred embodiment as illustrated in the accompanying drawings, in which:

FIG. 2 is a graph illustrating the square of the modulus of the summed backscattering amplitude for a conducting sphere, coated with a layer of dielectric material depicted in FIG. 1a;

DESCRIPTION OF THE PREFERRED EMBODIMENT

Figure 1:
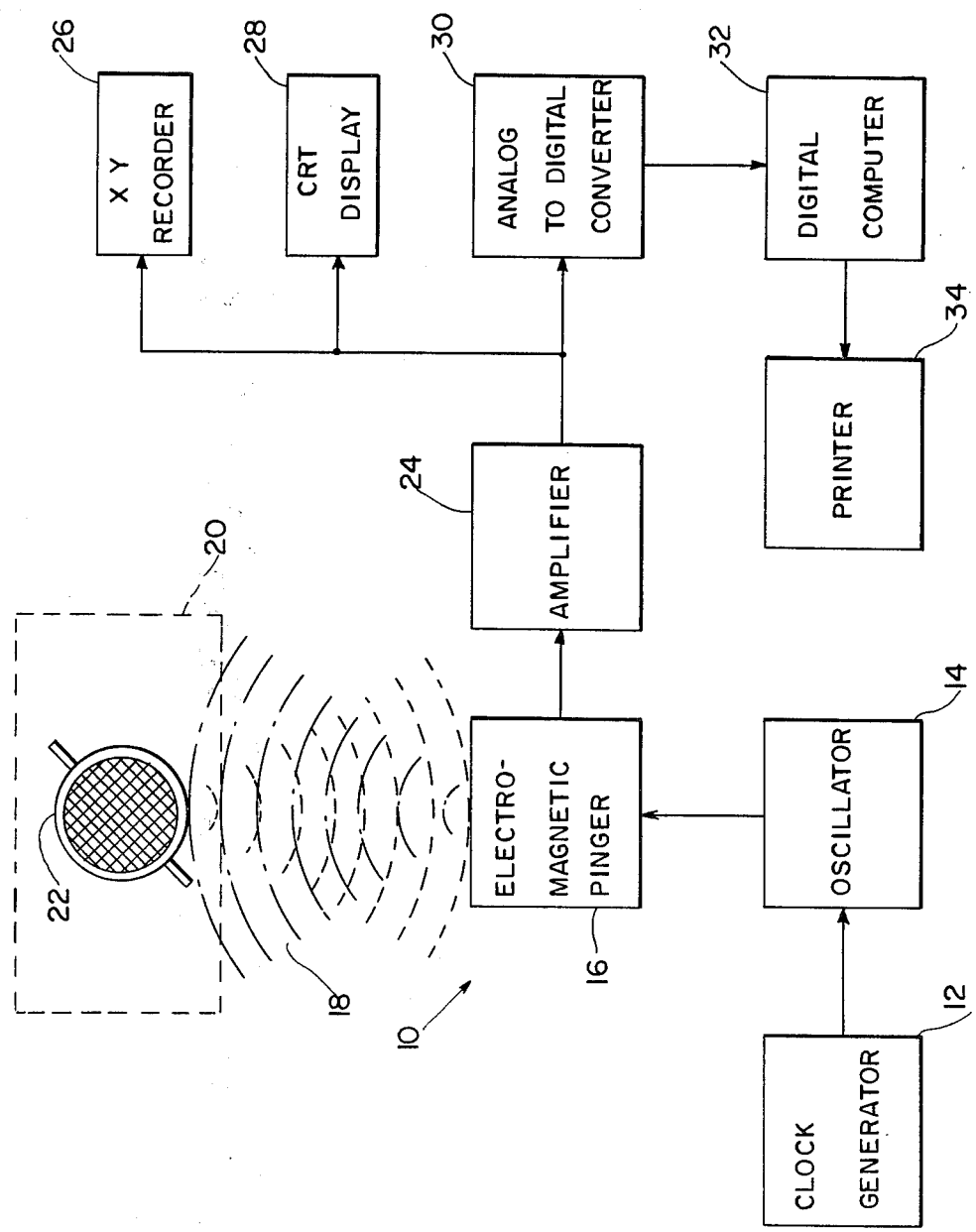
FIG. 1 is a block diagram representation of the apparatus used to carry out the method according to the present invention.

Referring to FIG. 1, an apparatus suitable for performing the target identification according to the present invention is disclosed. Measurement apparatus 10 includes a clock generator 12 which drives an oscillator 14. Pulses or cw waveforms generated by oscillator 14 excite an electromagnetic pinger 16, acting in a transmitting mode, such that electromagnetic radar waveforms 18 of a known frequency and/or spectra are broadcasted. The radar waveforms 18 travel through space and eventually impinge on a radar target/obstacle 20, schematically depicted as a satellite model 22. Electromagnetic pinger 16, acting in a receiving mode, picks up the echoes of the backscattered waveforms which are reflected from satellite model 22. These echo signals are, in turn, fed to an amplifier 24 where they are amplified and fed to an XY recorder 26 and or to a CRT display 28. The aforementioned echo signals may then be analyzed and deciphered manually or processed through an analog-to-digital converter 30, and then deciphered by a digital computer 32 containing a program written to automatically perform the aforementioned manual analysis. The method steps involving the manual analysis, either done manually or automatically by the combination of analog-to-digital converter 30 and digital computer 32, will be explained in the section called "Statement of the Operation" hereintofollow. The output of digital computer 32 may then be used to drive a printer 34 which provides the desired material composition and target-geometry information according to the method of the invention.

STATEMENT OF THE OPERATION

Figure 1A:
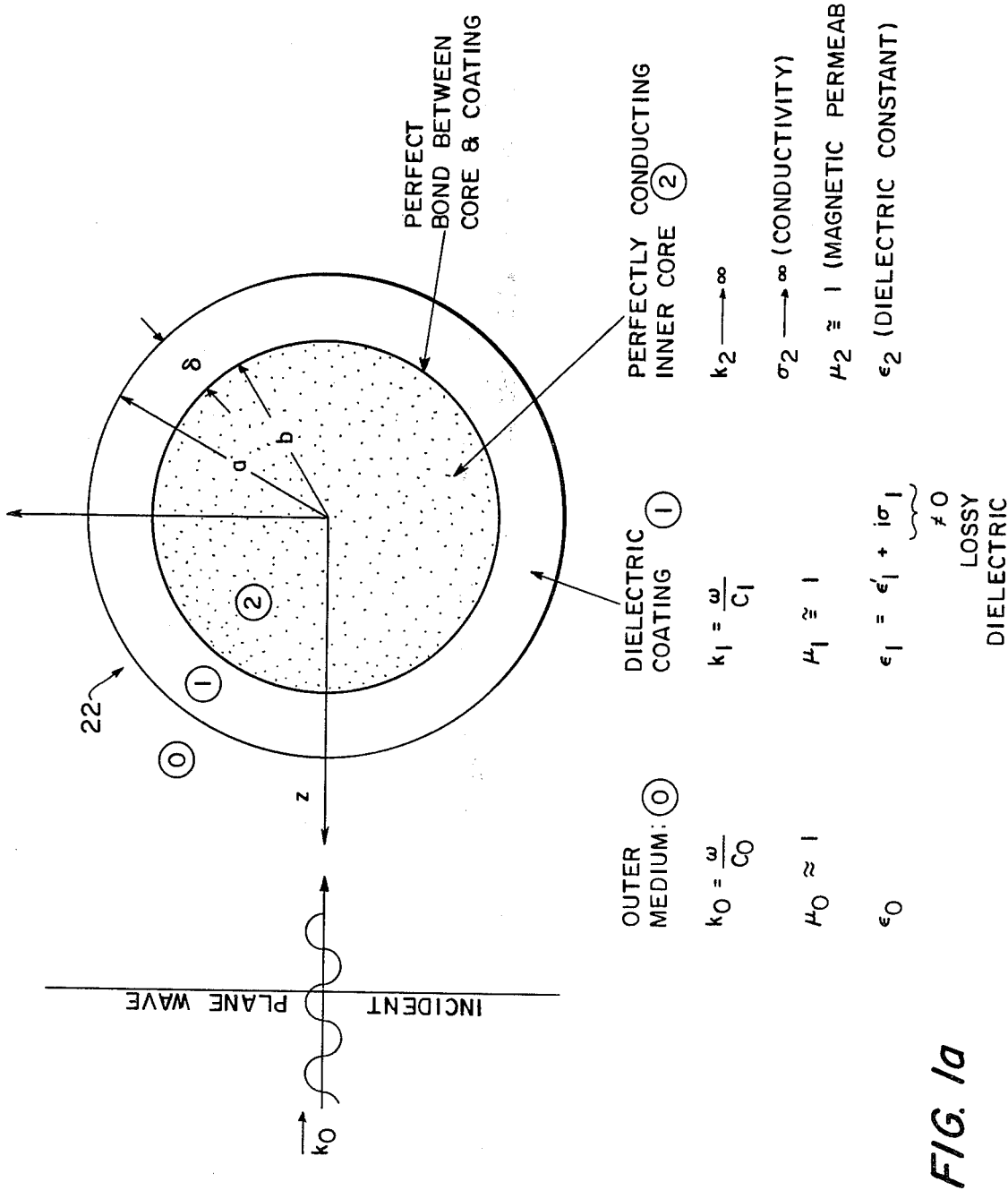
FIG. 1a is a more detailed representation of the radar target of FIG. 1 necessary to carry out the present invention.

Details of the operation and the analysis leading to a method of the present invention can best be understood by referring to FIG. 1 again, and to FIG. 1a.

Referring then to FIG. 1, clock generator 12 generates a system clock consisting of a continuous wave signal or of a continuous series of timing pulses. These signals are then fed to oscillator 14 where they cause it to be locked on to a particular frequency determined by the values of its circuit parameters. For purposes of the invention, the timing pulses are at the arbitrary frequency of 10 GHz, with a duty cycle of 33%, and the frequency of operation of oscillator 14 is in the order of 10 GHz. The output of oscillator 14 being operatively connected to electromagnetic pinger 16 causes it to transmit electromagnetic waveforms 18 at a power level, frequency and duty cycle sufficient for proper operation of the present invention. These electromagnetic waveforms 18 propagate through the surrounding continuum until they encounter conducting/dielectric target/obstacle 20. For purposes of the invention and the explanation herein to follow, conducting/dielectric target/obstacle 20 is coated satellite-model 22 depicted in FIG. 1a. A portion of the energy of electromagnetic waves 18 incident upon satellite-model 22 is backscattered, and the echoes thereof returned to electromagnetic pinger 16, acting in a receiving mode, are picked up monostatically and the received echoes are then fed to amplifier 24 where they are amplified. The amplified echo signals are then fed to XY recorder 26 where they are plotted and recorded on a chart, or displayed on CRT display 28 and then photographed. In either case, a graph of the received echo signals is obtained, and the analysis to be described below can be initiated.

Referring to FIG. 1a, the above mentioned analysis is based on the fact that when a target in the form of satellite-model 22 comprising a perfectly conducting spherical core covered with a dielectric layer of coating material is set into electromagnetic oscillations by virtue of the waves incident upon it, the target prefers to vibrate at certain discrete frequencies which are the natural resonances of the object, and a set of modal resonances (fundamental and overtones) are thus created. These resonances characterize the target as if they were its signature and will be used to identify it, since the target communicates them to the waves or echoes that are reflected from it. From the usual spectral plots of the (squared) backscattered wave amplitudes versus non-dimensional frequency $k_o a = x$, it is possible to obtain these resonances which will manifest themselves as more or less wide spikes. See FIG. 5. (Note; $k_o = \omega/c_o$, $\omega$ = circular frequency of the incident wave, $c_o$ = speed of light in the ambient medium, and a = outer radius of the spherical coated target). The (squared) amplitude or radar cross section of the target as displayed in this type of plot is a quantity that we will call "the echo" for simplicity. The way the resonance-features communicated by the target to its "echo" are used here for material-discrimination or target-identification purposes resembles the way chemical elements are (unambiguously) identified from their optical spectra.

The normalized backscattered amplitude $f(\theta)$, whose square yields the normalized radar cross-section of the target (i.e., $\sigma/\pi a^2 = |f(\theta)|^2$) is given by $$f(\theta) = \sum_{n=0}^{\infty} f_n(\theta) = \sum_{n=0}^{\infty} (-1)^n \frac{2n+1}{k_0 a} (a_n - b_n) \quad (1)$$

where $a_n$, $b_n$ are "Mie-type" coefficients which for the situation at hand have been found to be.

$$a_n = -\frac{x j_n(x) - i [x j_n(x)]' Z_n}{x h_n^{(1)}(x) - i [x h_n^{(1)}(x)]' Z_n} \quad (2a)$$

$$b_n = \frac{x j_n(x) - i [x j_n(x)]' Y_n}{x h_n^{(1)}(x) - i [x h_n^{(1)}(x)]' Y_n} \quad (2b)$$

where the nth-order modal impedances $Z_n$ and admittances $Y_n$ are quantities available in the literature (Ref. 1) for this configuration, and which are determined from the boundary conditions of the problem.

Figure 2:
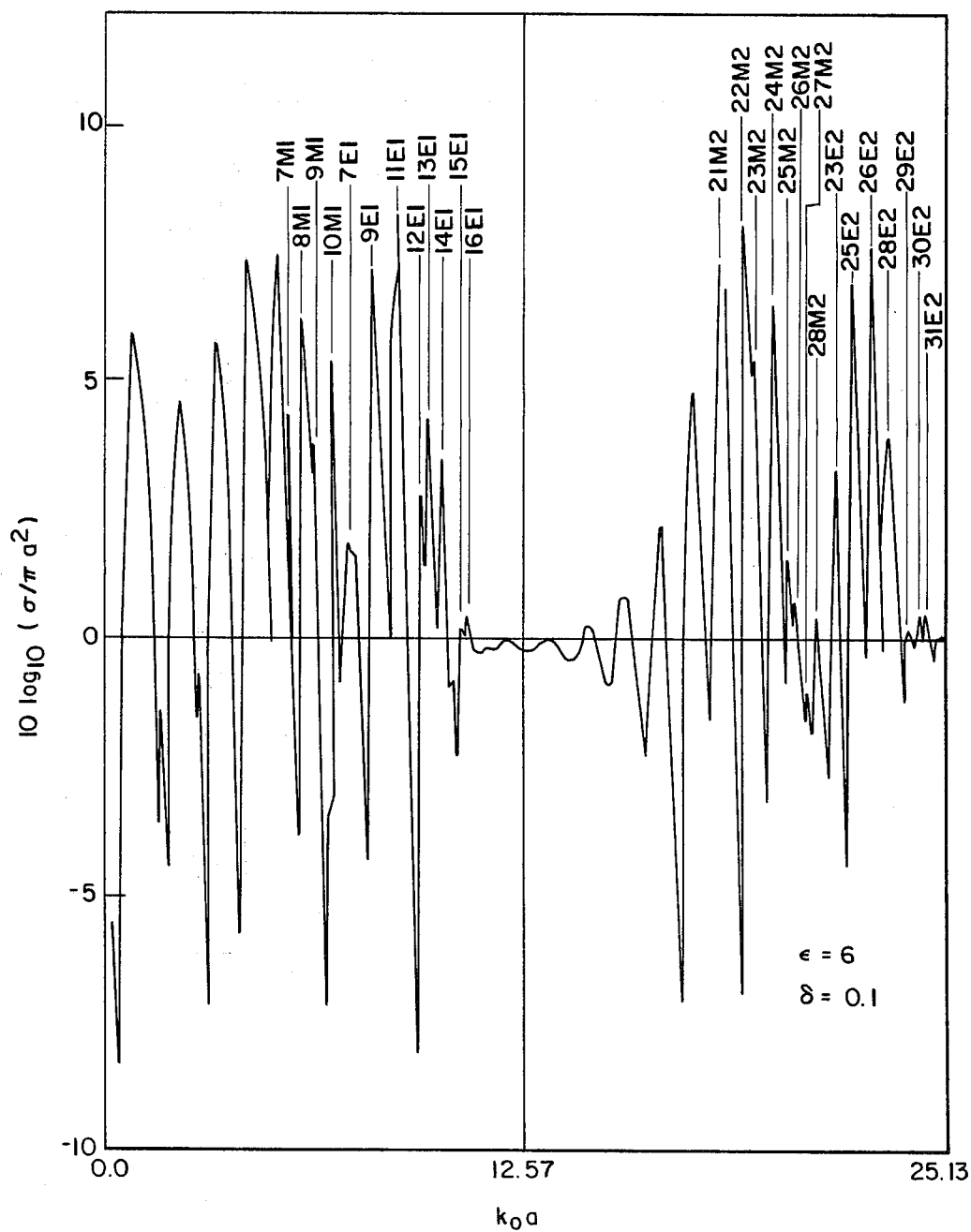

FIG. 2 shows a plot of the square of the modulus of $f(\theta)$ (with logarithmic ordinates in decibels) plotted versus $k_0 a \equiv x$ in the range $0 \leq x \leq 25.13$, and it can be considered to be "the echo" containing the rapid oscillations, deep extrema, and complex features mentioned before. This plot can be generated by computer with sufficient reproducible accuracy by adding about thirty terms in the series shown in Eq. (1). One of the main assets of our "Resonance Theory of Scattering" (Ref. 2) as it applies to radar backscattering is that considerable simplification is introduced by the analysis of each individual partial-wave or normal-mode contribution, that according to Eq. (1) makes up the radar cross-section plotted in FIG. 2, rather than by the analysis of the whole (or summed) cross-section displayed in FIG. 2.

Figure 3A:
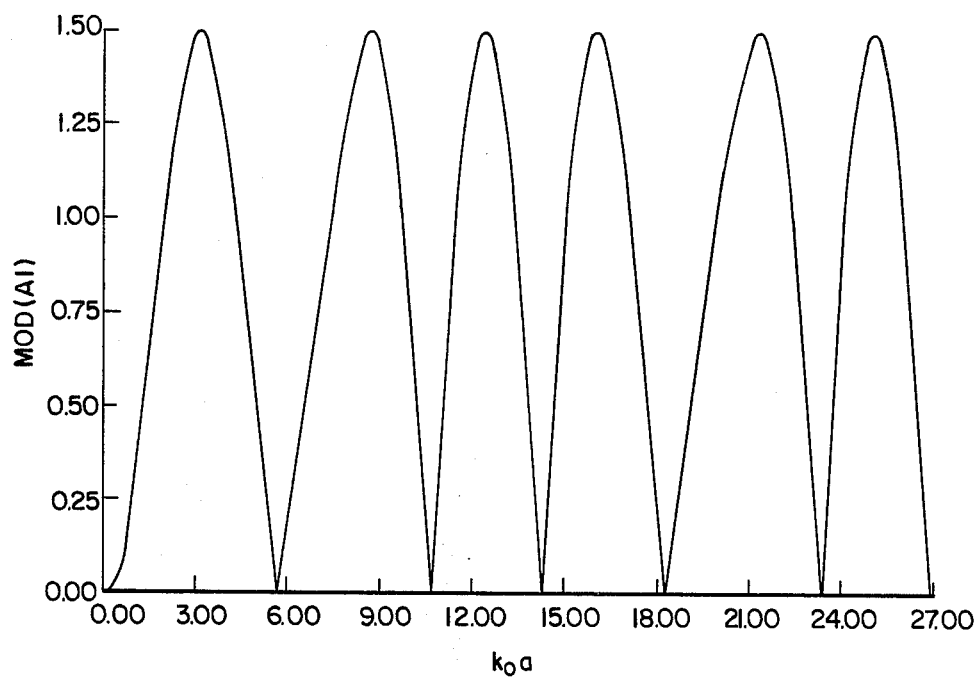
FIGS. 3(a), (b) are graphs of the cross-sectional spectra of one of the TE modal contributions, (ie, n=1) and one of the TM-modal contributions (i.e., n=1) which when added together which high modes form the cross-section in FIG. 2.
Figure 3B:
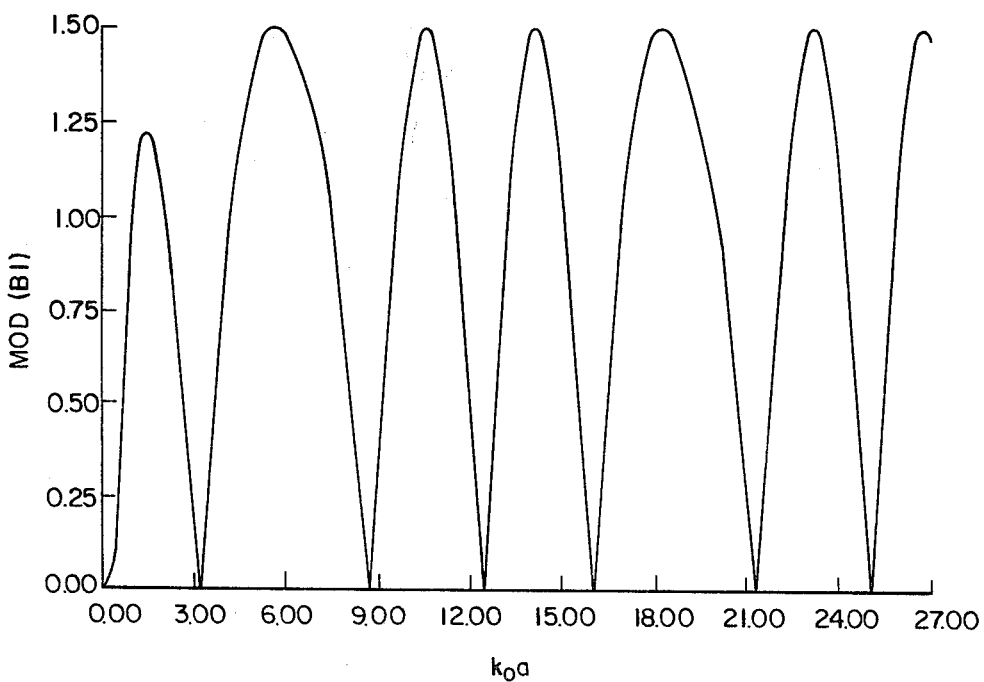

FIGS. 3(a) and 3(b) display graphs of the cross-sectional spectra of the n=1, TE and TM modal contributions to the cross-section, respectively. Contributions like these add-up to the summed cross-section shown in FIG. 2. This is all for the coated sphere shown in FIG. 1(a).

Figure 4A:
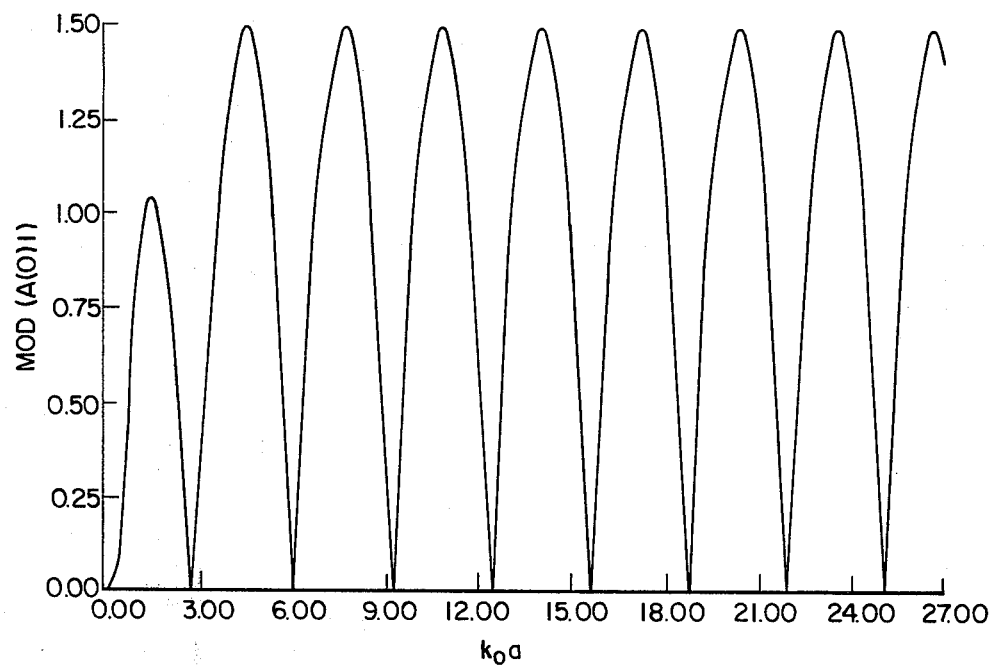
FIGS. 4(a), (b) are plots of the cross-sectional spectra of one of (i.e. n=1) the TE and one (n=1) of the TM modal contributions (4a, 4b, respectively) for a perfectly conducting sphere of radius a, having no coating.
Figure 4B:
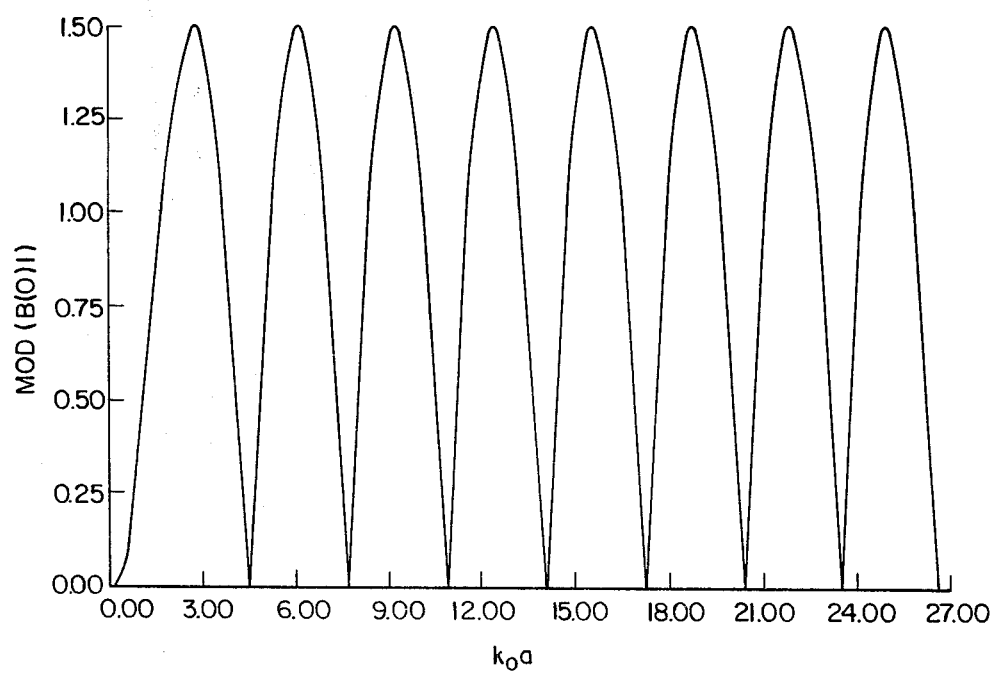

FIGS. 4(a) and 4(b) are the "backgrounds" associated with FIGS. 3(a) and 3(b). They are obtain just like FIGS. 3(a), (b) but for a perfectly conducting sphere of radius a, having no coating on top.

Figure 5A:
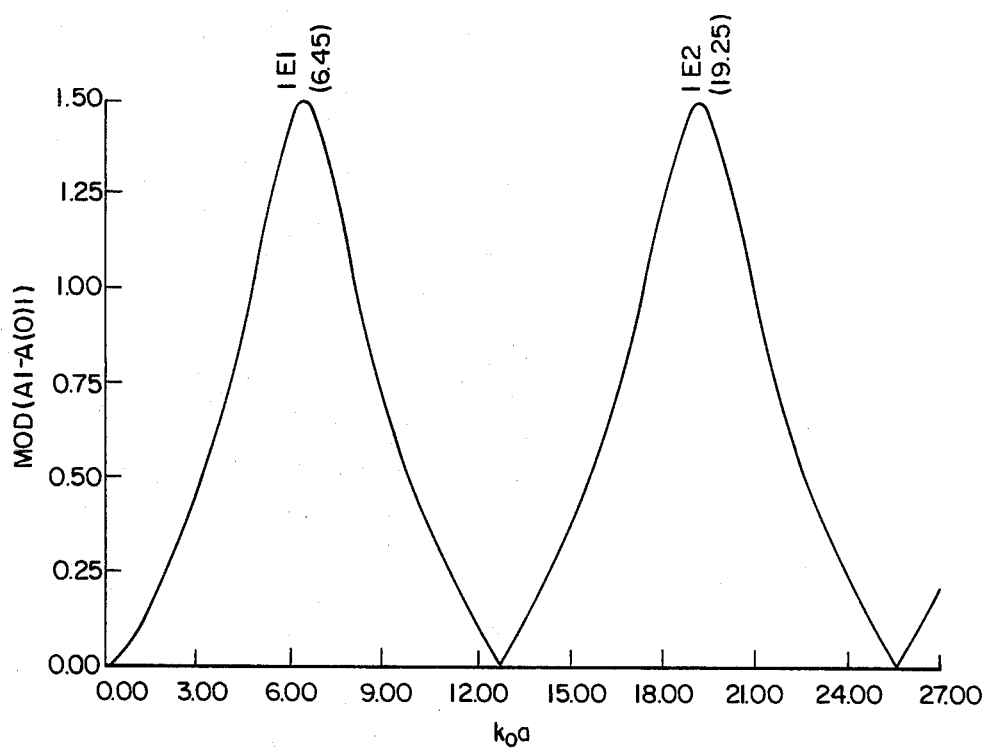
FIGS. 5(a), (b) are plots of the modal resonances contained in the n=1 mode, for the TE (5a), and TM (5b) cases, respectively. These graphs are the results of subtracting FIGS. 4(a), (b) from FIGS. 3(a), (b) respectively.
Figure 5B:
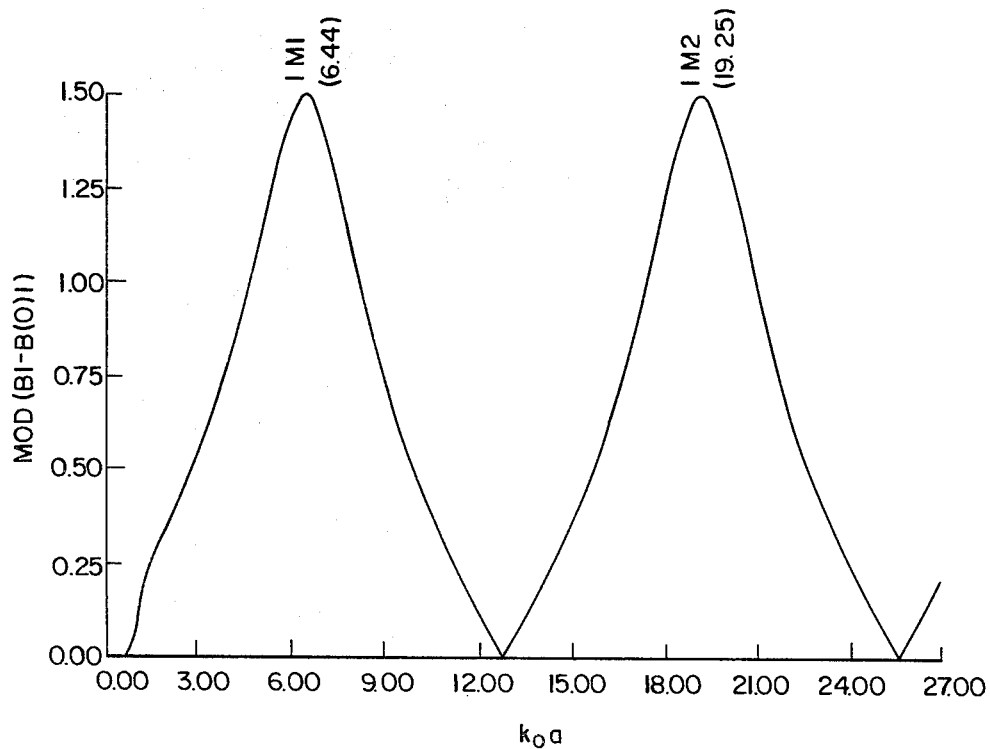

FIGS. 5(a) and 5(b) are plots of the modal resonances extracted from the first mode (i.e., for n=1) by subtracting the backgrounds in FIG. 4 from the modal contributions in FIG. 3. Parts (a) of these figures corresponds to the TE modes and (b) to the TM modes.

Modal contributions like the ones shown in FIG. 3 are added together according to Eq. (1) to obtain the rapidly oscillating cross-section shown in FIG. 2. Resonance features such as the resonance spikes clearly visible in those graphs (FIG. 5) can already be used to identify some of the rapid oscillations present in FIG. 2, which are caused by these individual modal-resonances (fundamentals and/or overtones). If n is the mode-order and l is the overtone index, then the notation (n,E,l) or (n,M,l) denotes the lth overtone of the nth electric (E) or magnetic (M) modes. Many of these resonances labeled in this fashion have been identified in FIG. 2 and are marked there by arrows showing which resonance is responsible for which "wiggle" in that figure.

It is noted that these already evident resonance-features in the "modal echoes" can be systematically isolated in the manner previously described (Ref. 2) by substracting the known "backgrounds" of a perfectly conducting spherical target of radius a, not covered by any dielectric coating. This "background limit" is obtainable from the expressions given above simply by setting $Z_n = 0$ for the TE-modes, and $Y_n = \infty$ for the TM-modes and it is graphically exhibited in FIG. 4. The substraction of the "backgrounds" isolates the resonances in a fashion resembling our discussions in U.S. Pat. No. 4,249,422, granted Feb. 10, 1981. We have also shown that the TE-modes (or TM-modes) play the equivalent role of an acoustically or elastically "soft" (or "rigid") target, although the types of waves, radiation, methodology, and frequencies involved, are all quite different.

As anticipated above, once the set of l (l=1,2,3, ... ) resonances of each mode n (n=0,1,2, ... ) have been identified and/or isolated, they can be labeled with the notation (n,E,l) or (n,M,l) as stated earlier. Comparing the spectral location of these electric or magnetic sets of resonances shown in FIG. 5 with the summed cross-sectional plot of FIG. 2, it is possible to associate each modal resonance with the cross-sectional "wiggle" it causes. Over two dozen such resonance-caused wiggles for the target whose cross-section is displayed in FIG. 2 have been identified. Since each dielectric substance has its own set of identifying resonances, one could construct a "library of signatures", and the echo of each unknown radar-target could be compared to these library entries for identification purposes.

While the "library of signatures" approach is a fully possible and effective means of target-identification, and for very complex flying targets it may be the only feasible way to actually characterize their many distinguishing features, it turns out that for the relatively simple spherical satellite model we have analyzed here, and in our publications (Ref. 2,3), there are quicker simplifying asymptotic methods to fully identify the target's material and geometrical parameters. This quicker approach is dependent on the spacing between any two consecutive high-order overtones of any given mode, and on the width of these overtones. We have shown (Refs. 2,3) that using these two parameters (spacing and width) we can extract the value of the coating's thickness $\delta$ and its dielectric constant $\epsilon_1$. There are no other material parameters related to the impenetrable and perfectly conducting spherical core underneath the penetrable dielectric coating, which requires further determination.

In the manner described in our publications (Refs. 2,3), let $\Delta_l$ be the spacing between the lth and the (l+1)th overtone of any TE or TM mode of order n, and let l be large. This spacing $\Delta_l$ is a quantity that can be simply read of the plots of the modal waveforms (i.e., FIG. 5), once the resonances have been isolated by background substraction. We have demonstrated (Refs. 2, 3) that $\Delta_l$ is given by the simple formula $$\Delta_l = x_{l+1}^{TE, TM} - x_l^{TE, TM} = \frac{\pi}{\epsilon_1 (\delta/a)} \quad (3)$$

where b is the radius of the conducting core, a is the radius of the core plus the penetrable coating of dielectric constant $\epsilon_1$ and thickness $\delta = a - b$. (See FIG. 1a.)

We have also demonstrated that the widths $\Gamma_{nl}^{TE,TM}$ of any overtone of any given mode n (TE or TM) is given by a rather complicated expression and that when the overtone order is high enough (i.e., $l \gg 1$), it simplifies considerably. If that simplified expression is evaluated one half-width below any resonance l of any mode n, i.e., at $$x = x_{nl}^{TE} - \tfrac{1}{2}\Gamma_{nl}^{TE} \equiv X_{nl}^{TE}, \quad (4)$$

(for TE-modes, say)

then the result of the evaluation asymptotically leads to $$\sqrt{\epsilon_1} = \tan\left[X_n^{TE}\sqrt{\epsilon_1}\,\frac{\delta}{a}\right] \quad (5)$$

The evaluation-points $X_{nl}^{TE}$ can either be read of the plots, or calculated by means of Eq. (4). These quantities $X_{nl}^{TE}$ contain the widths $\Gamma_{nl}^{TE}$ of the resonances. It is clear that Eqs. (3) and (5) form a system of two algebraic equations in two unknowns $\delta/a$, and $\epsilon_1$, which can be solved to yield $$\frac{\delta}{a} = \frac{\pi}{\Delta_l}\cot\left(\frac{\pi X_{nl}^{TE}}{\Delta_l}\right) \quad (6a)$$

$$\sqrt{\epsilon_1} = \tan\left(\frac{\pi X_{nl}^{TE}}{\Delta_l}\right) \quad (6b)$$

Expressions analogous to these (but with the tangent and cotangent functions interchanged) are found if instead we use the TM-modes.

Equations (6) determine the relative thickness and the dielectric constant of the coated target in terms of the separation and width parameters $\Delta_l$ and $X_{nl}$, which are either read from the plots or calculated numerically from Eqs. (3) and (4).

We next exhibit a (sample) calculation performed using the TE-resonances in FIG. 5a (for the n=1 electric mode and the l=2 overtone contained in it, which occurs at $x = k_o a = 19.25$ with a separation of $\Delta_{l=2} = 12.80$ and a width of $\Gamma_{12} = 5.61$ From Eg. (4) we find $$X_{l=2}^{TE} = 19.25 - 5.61/2\sqrt{3} = 17.63$$

where the $\sqrt{3}$ is included here for reasons explained in our earlier work (Ref. 4). Inserting this value for $X_{l=2}^{TE} = 17.63$ and the above value for $\Delta_{l=2} = 12.80$ into Eq. (6a) actually yields $\delta/a = 0.0995$, which is a value very close to 0.1 as was used by us, by Rheinstein (Ref. 5), and as can be seen in FIG. 2. Insertion into Eq. (6b) yields $\sqrt{\epsilon_1} \approx \sqrt{6}$ which again checks against our earlier calculations, those of Rheinstein (Ref. 5), and as we again show here in FIG. 2. This means that the actual value of the coating thickness and the value of the dielectric constant can be extracted from the data we have used, which for this illustration consisted of the first couple of resonances of the first electric mode. We could have used any other resonance-pair in any other mode, electric or magnetic, numerically computed, or read of the partial-wave (or mode) graphs. The use of higher order overtones (we here used the first two) will increase the accuracy of our predicted estimates of $\delta/a$ and $\epsilon_1$ (i.e., 0.1 and 6, respectively). Thus, all the parameters describing the material composition and geometry of the present coated satellite-model have been extracted from the analysis of the radar echoes it has returned.

A similar analysis may be carried out for targets of general shape but unknown composition. Shape information may be obtained, as in the case of nuclear photon scattering from the splitting and relative weights of the resonances. The resonance frequencies of a penetrable prolate spheroidal target, for instance, are split into two different sets $f_{nm}^{(l)}$ and $f_{nm}^{(s)}$ corresponding to standing waves along a long or a short axis, respectively, with $f_{nm}^{(l)} < f_{nm}^{(s)}$. These two sets may be experimentally separated as follows. An incident polarized or unpolarized wave traveling along the long axis will excite only the $f_{nm}^{(s)}$ resonance. A wave incident along a short axis will excite the $f_{nm}^{(l)}$ or $f_{nm}^{(s)}$ resonances, depending on whether it is polarized either along the long or the short axis, respectively; if the wave is unpolarized it will excite both with equal weights. Incidence along any other direction will produce excitation of both sets of resonances with weights depending on the direction of incidence. This allows the lengths of the two axis and the target orientation to be determined. If both the shape and the composition of the target are unkown, these two types of analysis have to be combined.

Effectively, the identification process has been accomplished in this case, once the analysis described above has been completed. However, the process described above may just as well by pass the use of the XY recorder 26 or the CRT display 28 and instead, the signal present at the amplifier 24 could be directed to a digital computer 32, after it has been passed through an analog-to-digital converter 30. It is well within the ability of one with ordinary skill in the computer programming area to reduce the process described above to a digital program, so that it can be completed repeatedly in a fast, computerized way. Accordingly, the output of the analog-to-digital converter 30, after it is analyzed through the computer 32, provides the desired material identification, which could emerge as the output of the printer 34.

Summarizing, the above described computerized apparatus and process permits the complete identification of radar targets. The modal resonances, responsible as we saw for each "wiggle" present in the radar cross section of the target, not only give a clear physical meaning to the scattering process taking place around the target (Ref. 6), but in addition, generate all the information needed to identify targets exploiting the "resonance features" that all targets communicate to the echoes they return.

Additional remarks pertain to bistatic radar measurements that could also be performed. If bistatic determinations (i.e., away from the monostatic $\theta = \pi$ direction) of the target's cross-section are made at angles $\theta_{nl}$ chosen to be the zeroes of $P_n(\cos\theta)$ for a given mode n, the contribution from that nth mode to the summed cross section can be determined. In this manner, bistatic observations or calculations can be used to suppress and further disentangle the individual partial-wave contributions of each given mode n, from the sum of all the others.

The use of this process as described here to decipher the electromagnetic scattering code about material composition and geometrical parameters of a simple satellite model has obvious applications. The principal one pertains to target-identification, when one desires to distinguish decoys from real targets, whenever this situation occurs in the field of radar. It should be mentioned that in many instances radar, not sonar, may be used to detect/classify objects not too deeply burried underground. In cases like this, the present process will be helpful in the identification of these underground objects. This is true in any other situation where there is an electromagnetic wave-supporting medium through which radar pings and echoes can propagate. This includes environmental applications to the location of underground toxic wastes in dump sites, or on the location of underice oil spills in the Artic, just to mention a couple.

It should be understood, naturally, that the foregoing disclosure relates only to a preferred embodiment of the invention and that numerous modifications or alterations including the use of laser beam projectors instead of radar pingers may be made therein, without departing from the spirit and scope of the invention as set forth in the appended claims.

REFERENCES

1. G. T. Ruck et al., *Radar Cross Section Handbook*, Plenum Press, New York, 1970.
2. G. Gaunaurd, H. Überall, and P. J. Moser, "Resonances of dielectrically coated conducting spheres and the inverse scattering problem", Journ. of Appl. Physics 52, No. 1, 35–43, Jan. 1981.
3. G. Gaunaurd and H. Überall, "Electromagnetic spectral determination of the material composition of penetrable radar targets", NATURE 287, 708, Oct. 23, 1980,
4. G. Gaunaurd and H. Überall, "Identification of cavity fillers in elastic solids using the resonance scattering theory", ULTRASONICS 18, 261–269, Nov. 1980.
5. J. Rheinstein, "Scattering of electromagnetic waves from dielectric coated conducting spheres", IEEE Trans AP-12, 334–340 (1964).
6. L. Flax, G. Gaunaurd and H. Überall, "The Theory of Resonance Scattering", in *Physical Acoustics*, Vol. 15, Ch 3, 191–294, Academic Press, 1981 (W. P. Mason and R. N. Thurston, Editors.) Invited review chapter.

What is claimed is:

1. A method of determining the material properties of a target/obstacle comprising the steps of:
    directing electromagnetic energy in the form of incident wave pulses having a known frequency spectrum at said target/obstacle creating thereon, electromagnetic oscillations including a set of modal resonances superposed thereon;
    receiving a portion of said incident wave pulses backscattered from said target/obstacle and conditioning it into representative electrical signals;
    converting said electrical signals into an echo pattern ("radar cross-section") of said target/obstacle, said echo pattern being a plot of squared scattering amplitudes versus normalized frequency;
    subdividing said echo pattern into its partial-wave resonance components, each corresponding to a particular resonance mode;
    determining the background components of said partial-wave resonance components, said background components being the resonance response of a perfectly conducting scatterer of the same size of said target/obstacle, and said background components being obtained from said partial-wave components by setting the modal impedances ($Z_n$) and admittances ($Y_n$) equal to zero (0) and infinity ($\infty$), respectively;
    substracting each of said background components from each of said partial-wave resonance components of the same particular resonance mode, thereby isolating the resonances in the frequency spectrum which are the fundamental frequency and its overtones for each modal contribution; and
    measuring the asymptotic spacings between any two consecutive modal overtones and the asymptotic widths of any two consecutive modal overtones, said asymptotic spacings and said asymptotic widths being used to obtain the dielectric constant and the thickness of the coating layer covering the conducting core of said target/obstacle.

2. The method of claim 1 wherein said asymptotic spacings and said asymptotic widths are used to determine only the dielectric constant, if said target/obstacle is totally dielectric with no conducting core.

3. The methods of claim 1 or 2 wherein the step of converting said electrical signals includes the step of:
    plotting said echo pattern and its modal components as functions of the normalized frequency x, where x is proportional to the frequency of said incident wave pulses times the radius a of said target/obstacle divided by the speed of light in the ambient medium.

4. The methods of claim 1, 2, or 3 wherein said asymptotic spacings and said asymptotic widths are used to determine the value of the dielectric constant $\epsilon_1$, and the thickness $\delta/a$ of the coating layer by use of the asymptotic formulas, $$\epsilon_1 = \tan\left(\frac{\pi X_{nl}^{TE}}{nl}\right), \text{ and } \frac{\delta}{a} = \frac{\pi}{\Delta_l}\cot\left(\frac{\pi X_{nl}^{TE}}{\Delta_l}\right); \text{ where}$$

$\pi$ is the number 3,1415 . . . , $\Delta_l$ is the separation or spacing between two consecutive modal overtones at any normal mode contained within the radar cross-section, and $X_{nl}^{TE}$ is a quantity related to the width $\Gamma_{nl}^{TE}$ of the modal resonances of the transverse electric modes of oscillation and is given by $$X_{nl}^{TE} = X_{nl}^{TE} - \tfrac{1}{2}\Gamma_{nl}^{TE}, \text{ where}$$

$X_{nl}^{TE}$ are the resonances labeled by the indices nl.

* * * * *